(12) United States Patent
Riddell (10) Patent No.: US 8,177,462 B2
(45) Date of Patent: May 15, 2012

(54) SYSTEM AND METHOD FOR ARRANGING WIND TURBINE BLADES

(75) Inventor: Scott Gabell Riddell, Greer, SC (US)

(73) Assignee: General Electric Company, Schenectady, NY (US)

(*) Notice: Subject to any disclaimer, the term of this patent is extended or adjusted under 35 U.S.C. 154(b) by 149 days.

(21) Appl. No.: 12/632,199

(22) Filed: Dec. 7, 2009

(65) Prior Publication Data

US 2011/0135417 A1    Jun. 9, 2011

(51) Int. Cl.
*B60P 7/06* (2006.01)
*B61D 3/16* (2006.01)

(52) U.S. Cl. .......................... 410/44; 410/31

(58) Field of Classification Search ............ 410/44, 410/31, 101, 45, 46, 47, 32, 33, 34, 35, 53, 410/82, 77, 2; 280/400, 404; B60P 7/06; B61D 3/16
See application file for complete search history.

(56) References Cited

U.S. PATENT DOCUMENTS

| | | | |
|---|---|---|---|
| 1,996,695 A * | 4/1935 | Bigley, Jr. ........................ 410/45 |
| 2,335,692 A | 11/1943 | Murray |
| 2,725,241 A * | 11/1955 | Leonard, Jr. .................... 410/44 |
| 2,808,288 A | 10/1957 | Benson |
| 4,341,494 A * | 7/1982 | Fedele ............................ 410/45 |
| 4,750,785 A * | 6/1988 | Helton .......................... 298/8 R |
| 5,947,665 A | 9/1999 | Baur et al. |
| 6,983,844 B2 | 1/2006 | O'Kane et al. |
| 7,303,365 B2 * | 12/2007 | Wobben ......................... 410/45 |
| 7,429,156 B2 * | 9/2008 | Jensen ............................ 410/45 |
| 7,967,536 B2 | 6/2011 | Broderick et al. |
| 2003/0175089 A1 | 9/2003 | Almind |
| 2006/0251517 A1* | 11/2006 | Grabau ......................... 416/202 |
| 2007/0177954 A1* | 8/2007 | Kootstra et al. ................ 410/44 |
| 2008/0296197 A1 | 12/2008 | Koostra |

FOREIGN PATENT DOCUMENTS

WO    2005/005286    1/2005

* cited by examiner

*Primary Examiner* — Glenn Dayoan
*Assistant Examiner* — Sunsurraye Westbrook
(74) *Attorney, Agent, or Firm* — Dority & Manning, P.A.

(57) ABSTRACT

A system for arranging wind turbine blades includes first and second root cradles and a first support proximate to the second root cradle. A first tip cradle is rotatably connected to the first support, and a second tip cradle is proximate to the first root cradle. A method for arranging wind turbine blades includes transferring a first wind turbine blade proximate to a first root cradle and rotating the first wind turbine blade at least 90 degrees so that the first wind turbine blade is angled approximately 20 to 90 degrees with respect to a horizon. The method further includes transferring a second wind turbine blade proximate to a second root cradle and nesting the second wind turbine blade with the first wind turbine blade.

20 Claims, 6 Drawing Sheets

SYSTEM AND METHOD FOR ARRANGING WIND TURBINE BLADES

FIELD OF THE INVENTION

The present invention generally involves wind turbine blades. In particular, the present invention discloses and enables systems and methods for arranging at least two wind turbine blades for storage and/or transport.

BACKGROUND OF THE INVENTION

Wind turbines are well known in the art for converting kinetic energy from the wind to mechanical or electrical energy, and wind turbine blades exist in various shapes and sizes. For example, some blades include a root at one end and a tip at the opposite end. The blade root attaches to a rotor, and the blade extends radially outward from the blade root to the blade tip. The blade may have a rounded or curved leading edge (i.e., the edge facing the direction of rotation) and a tapered or pointed trailing edge (i.e., the edge facing away from the direction of rotation), producing a blade with an aerodynamic or airfoil shape. In addition, the blade may be curved from the blade root to the blade tip, creating a convex surface on the top of the blade (i.e., the surface of the blade facing toward the oncoming wind) and a concave surface on the back of the blade (i.e., the surface of the blade facing away from the oncoming wind).

The length, width, curvature, and weight of wind turbine blades varies, depending on the size of the wind turbine, anticipated wind speeds, and other design considerations. For example, wind turbine blades may extend greater than 100 feet, have an effective width of 9 feet or greater, curve more than 6 feet from blade root to blade tip, and weigh more than 13,000 pounds.

State and local transportation regulations include limits regarding the maximum allowed width and height of items transported on public roads. For example, in the U.S., the maximum allowable width is typically 8½ feet, and the maximum allowable height ranges between 13½ and 14 feet, depending on the location. In Europe, the maximum allowable width is typically 3.5 meters, and the maximum allowable height is 4.45 meters. As a result, the size, shape, and weight of wind turbine blades generally requires that wind turbine blades be transported individually so as to not exceed the allowable size limits, increasing the cost of transporting wind turbine blades.

Therefore the need exists for an improved system and method for arranging wind turbine blades for transport and/or storage so that more than one wind turbine blade can be transported at the same time on public roads.

BRIEF DESCRIPTION OF THE INVENTION

Aspects and advantages of the invention are set forth below in the following description, or may be obvious from the description, or may be learned through practice of the invention.

One embodiment of the present invention is a system for arranging first and second wind turbine blades. The system includes a first root cradle and a second root cradle opposed to the first root cradle and separated from the first root cradle. The system further includes a first support proximate to the second root cradle, a first tip cradle rotatably connected to the first support, and a second tip cradle proximate to the first root cradle.

Another embodiment of the present invention is a method for arranging at least two wind turbine blades. The method includes transferring a first wind turbine blade proximate to a first root cradle and rotating the first wind turbine blade at least 90 degrees so that the first wind turbine blade is angled approximately 20 to 90 degrees with respect to a horizon and a trailing edge of the first wind turbine blade is lower than a leading edge of the first wind turbine blade. The method further includes transferring a second wind turbine blade proximate to a second root cradle and nesting the second wind turbine blade with the first wind turbine blade.

In yet another embodiment of the present invention, a method for arranging at least two wind turbine blades includes transferring a first wind turbine blade proximate to a first root cradle and rotating the first wind turbine blade so that the first wind turbine blade is angled approximately 20 to 90 degrees with respect to a horizon and a trailing edge of the first wind turbine blade is lower than a leading edge of the first wind turbine blade. The method further includes transferring a second wind turbine blade proximate to a second root cradle and rotating the second wind turbine blade so that the second wind turbine blade is angled approximately 20 to 90 degrees with respect to the horizon and a trailing edge of the second wind turbine blade is higher than a leading edge of the second wind turbine blade.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof, is set forth more particularly in the remainder of the specification, including reference to the accompanying figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not as a limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

FIGS. 1 through 4 provide perspective views of a system 10 for arranging first and second wind turbine blades 12, 14 for transport and/or storage according to one embodiment of the present invention. Each wind turbine blade 12, 14 generally includes a blade root 16, 18 at one end and a blade tip 20, 22 at the opposite end. Each blade root 16, 18 is generally round in cross-section and includes bolts, screws, studs 24, or other structure known in the art for attaching a wind turbine blade to a rotor of a wind turbine. The wind turbine blades 12, 14 typically extend up to 80-120 feet, or more, and gradually curve from the blade root to the blade tip, creating a convex 26 surface on one side and a concave 28 surface on the opposite side. In addition, the wind turbine blades 12, 14 may have a rounded leading edge 30 (i.e., the edge facing the direction of rotation) and a tapered trailing edge 32 (i.e., the edge facing away from the direction of rotation) that combine to give the wind turbine blades 12, 14 an aerodynamic or airfoil shape. Wind turbine blades often include additional internal structural support behind the leading edge 30 to facilitate transferring and transporting the relatively heavy and fragile wind turbine blades.

The system shown in FIGS. 1 through 4 arranges the first and second wind turbine blades 12, 14 in an inverted position to one another, both vertically and horizontally. That is, each blade root 16, 18 is near or proximate to the blade tip 22, 20 of the opposite wind turbine blade, and each leading edge 30 is near or proximate to the trailing edge 32 of the opposite wind turbine blade. In addition, the wind turbine blades are nested so that the convex surface 26 of one wind turbine blade faces the concave surface 28 of the other wind turbine blade.

The system 10 shown in FIGS. 1 through 4 generally includes first and second root cradles 34, 36 and first and second tip cradles 38, 40. The root cradles 34, 36 and tip cradles 38, 40 provide support and cushioning for the blade roots 16, 18 and blade tips 20, 22, respectively, during transport and/or storage. For convention throughout this description, the first root cradle 34 and the first tip cradle 38 refer to the structures that support the first wind turbine blade 12, and the second root cradle 36 and the second tip cradle 40 refer to the structures that support the second wind turbine blade 14. The first and second root cradles 34, 36 are opposed to each other and are separated by a distance that may be approximately equal to the length of the wind turbine blades. The first tip cradle 38 is located closer to or proximate to the second root cradle 36 to support and cushion the blade tip 20 of the first wind turbine blade 12, and the second tip cradle 40 is located closer to or proximate to the first root cradle 34 to support and cushion the blade tip 22 of the second wind turbine blade 14.

The root cradles 34, 36 and tip cradles 38, 40 generally include cushions 44 or pads that form a seating surface which conforms to the exterior surface of the blade root or blade tip. The cushions 44 or pads may be configured to completely or partially surround the blade roots 16, 18 and/or blade tips 20, 22. Alternatively, a strap, banding, or other suitable device may be used to hold the wind turbine blades 12, 14 in place.

The first and second tip cradles 38, 40 may include complementary padded surfaces 46 shaped to conform to the shape of the wind turbine blades 12, 14. The complementary padded surfaces 46 define a first end 48 and a second end 50 in each tip cradle 38, 40. The first end 48 of each tip cradle 38, 40 is shaped to conform to and support the leading edge 30 of the wind turbine blades 12, 14. The second end 50 of each tip cradle 38, 40 is shaped to conform to and support the trailing edge of the wind turbine blades 12, 14. The second end 50 may include additional cushions 52 to further protect the trailing edge 32 of the wind turbine blades 12, 14, which is typically more delicate and prone to damage during transport and/or storage than the leading edges 30. The complementary padded surfaces 46 may further include a hinge 54 at the first end 48 and a hasp 56 or latch at the second end 50. The hinge 54 allows the complementary padded surfaces 46 to be pivotally separated or opened to receive a wind turbine blade. The complementary padded surfaces 46 may then be brought back together or closed and held in place by the hasp 56 or latch to hold the wind turbine blade in place.

Figure 1:
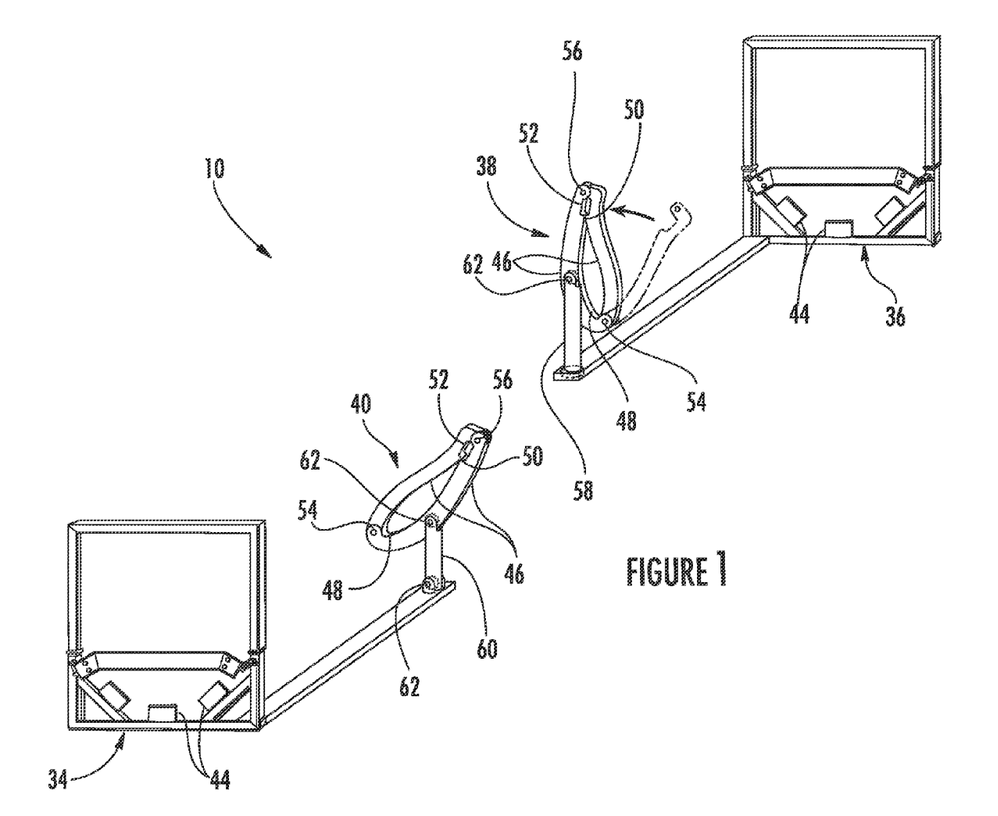
FIG. 1 is a perspective view of a system for arranging wind turbine blades according to one embodiment of the present invention.
Figure 2:
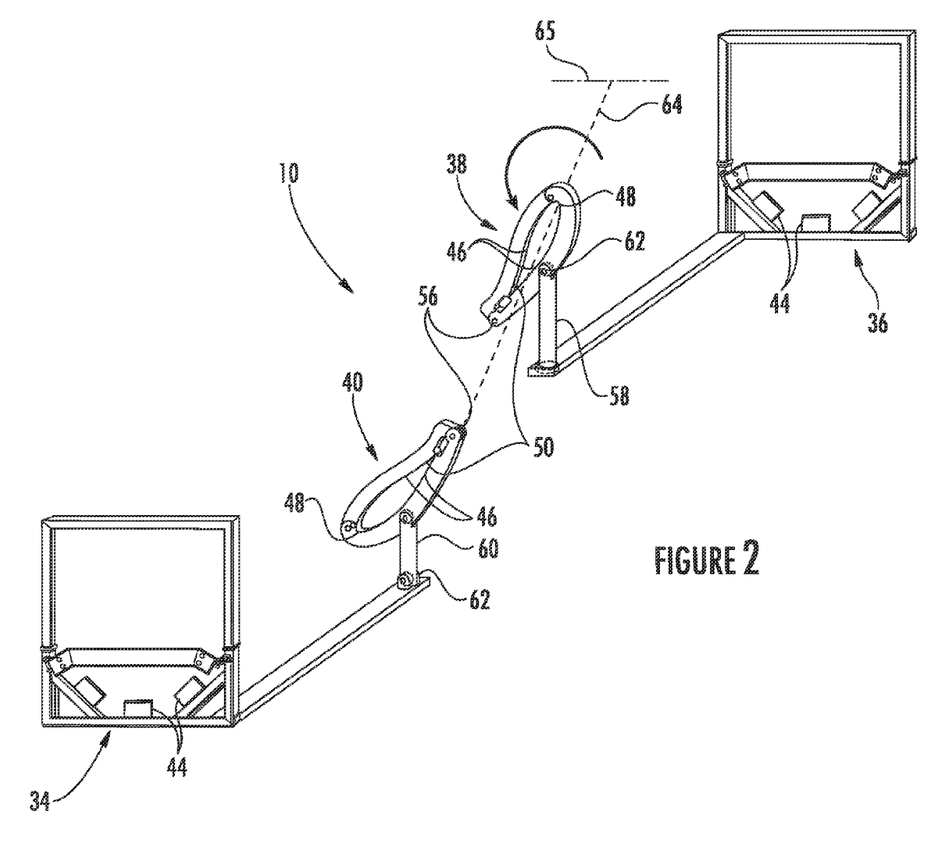
FIG. 2 is a perspective view of the system shown in FIG. 1 with the first tip cradle rotated.
Figure 3:
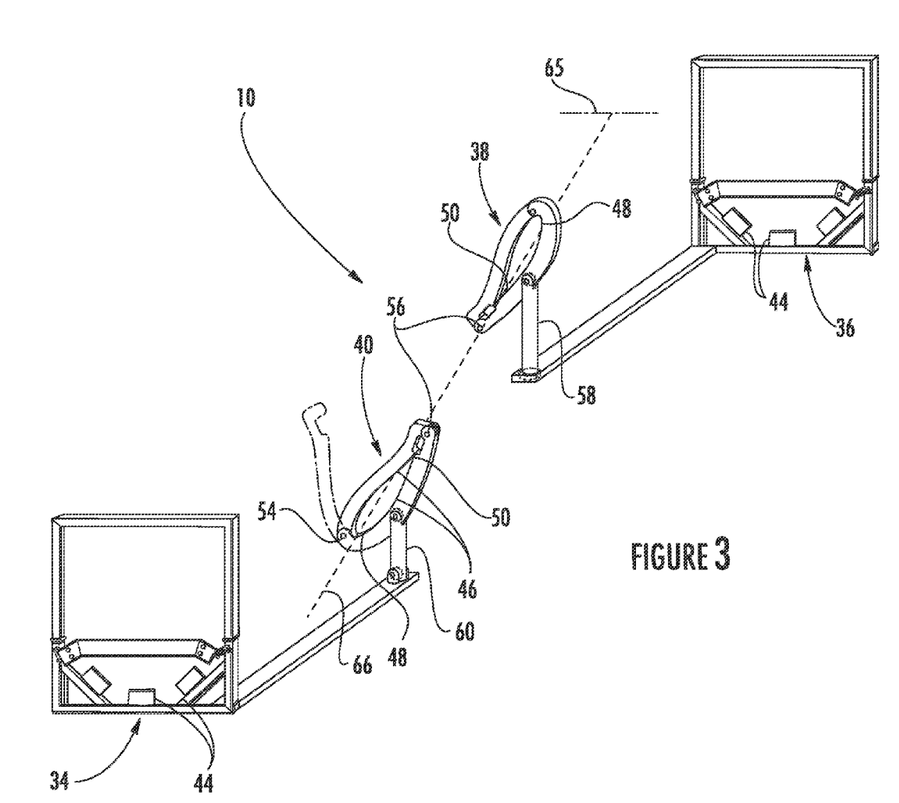
FIG. 3 is a perspective view of the system shown in FIG. 1 with the second tip cradle opened.

As shown in FIGS. 1, 2, and 3, the first and second tip cradles 38, 40 may be rotatably or pivotally connected to a first and second support 58, 60, respectively. In addition, the first and/or second supports 58, 60 may be rotatably or pivotally connected to either or both of the first and/or second root cradles 34, 36. The first and second supports 58, 60 may be a stanchion, rod, pole, or similar structure known to one of ordinary skill in the art for supporting the weight of the blade tip of a wind turbine blade. A ratchet 62, gear, bearing, or similar structure between each tip cradle 38, 40 and the associated support 58, 60 allows each tip cradle 38, 40 to rotate or pivot about the respective support 58, 60.

The first support 58 is typically closer to or proximate to the second root cradle 36, and the second support 60 is typically closer to or proximate to the first root cradle 34. The first and/or second supports 58, 60 may be structurally connected to either or both of the first and/or second root cradles 34, 36, as shown in FIGS. 1 through 4. Alternatively, as shown in FIG. 5, the first and second supports 58, 60 may be structurally separated from both the first and second root cradles 34, 36. As further shown in FIG. 5, the first and second supports 58, 60 may be attached to the spine or bed of a commercial carrier 68.

Due to the weight of wind turbine blades 12, 14 and the relative fragility of the trailing edge 32 of wind turbine blades, wind turbine blades are typically lifted and moved by cranes, hoists, or similar devices with the leading edge 30 down. As shown in FIG. 1, the complementary padded surfaces 46 of the first tip cradle 38 may be opened, and the first wind turbine blade 12 may then be transferred proximate to the first root cradle 34 with the leading edge 30 down. The blade tip 20 may then be positioned in the first tip cradle 38, and the complementary padded surfaces 46 of the first tip cradle 38 may then be closed and held shut by the hasp 56. The first wind turbine blade 12 may then be rotated to the position shown in FIG. 2, with the first tip cradle 38 protecting and supporting the leading 30 and trailing 32 edges while the first wind turbine blade 12 is rotated. As shown in FIG. 2, the complementary padded surfaces 46 of the first tip cradle 38 define a first support plane 64 angled approximately 20 to 90 degrees with respect to a horizontal line 65. In particular embodiments, the first support plane 64 may be angled approximately 30 to 80 degrees, 40 to 70 degrees, or 45 degrees with respect to the horizontal line 65. As a result, the first tip cradle 38 supports the first wind turbine blade 12 with the first end 48 of the first tip cradle 38 higher than the second end 50 of the first tip cradle 38.

Referring to FIG. 3, the complementary padded surfaces 46 of the second tip cradle 40 may be opened, and the second wind turbine blade 14 may then be transferred proximate to the second root cradle 36 with the leading edge 30 down. The blade tip 22 may then be positioned in the second tip cradle 40, and the complementary padded surfaces 46 of the second tip cradle 40 may then be closed and held shut by the hasp 56. The second wind turbine blade 14 may then be rotated, if necessary, to the position shown in FIG. 3, with the second tip cradle 40 protecting and supporting the leading 30 and trailing 32 edges while the second wind turbine blade 14 is rotated. As shown in FIG. 3, the complementary surfaces 46 of the second tip cradle 40 define a second support plane 66 angled approximately 20 to 90 degrees with respect to the horizontal line 65. In particular embodiments, the second support plane 66 may be angled approximately 30 to 80 degrees, 40 to 70 degrees, or 45 degrees with respect to the horizontal line 65. As a result, the second tip cradle 40 supports the second wind turbine blade 14 with the first end 48 of the second tip cradle 40 lower than the second end 50 of the second tip cradle 40.

As shown most clearly in FIGS. 1 through 3, the first tip cradle 38 may be at a higher elevation than the second tip cradle 40. This difference in elevation between the first and second tip cradles 38, 40 may be accomplished by a difference in length between the first and second supports 58, 60. Alternatively, the location of the pivotal connection between each tip cradle 38, 40 and its associated support 58, 60 may be adjusted to achieve the same difference in elevation between the first and second tip cradles 38, 40. The difference in elevation between the first and second tip cradles 38, 40 enhances the ability of the system 10 to nest the first and second wind turbine blades 12, 14 closer together to reduce the resulting width and height of the system 10 and wind turbine blades 12, 14.

Figure 4:
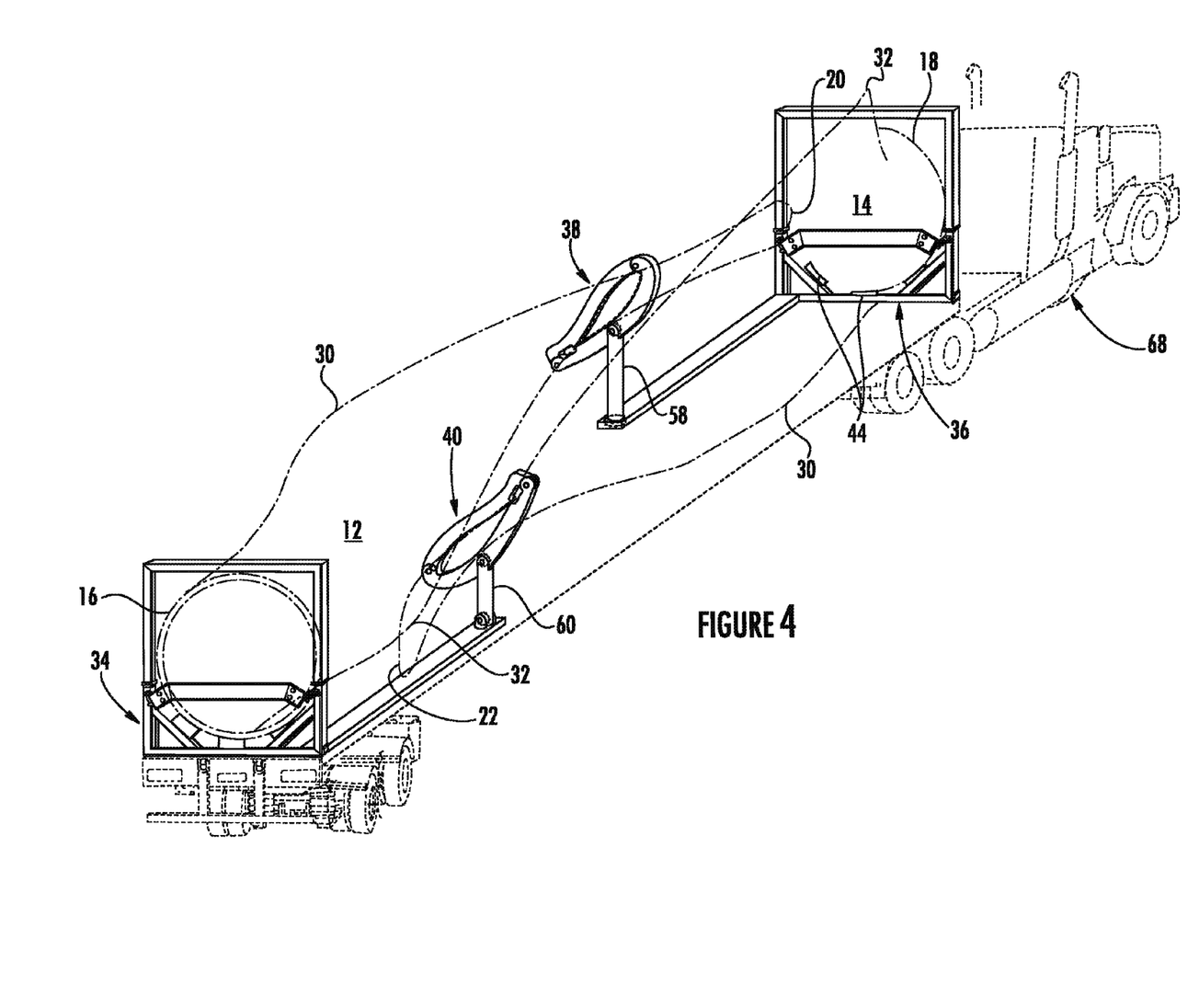
FIG. 4 is a perspective view of the system shown in FIG. 3 with wind turbine blades loaded on a commercial carrier.
Figure 5:
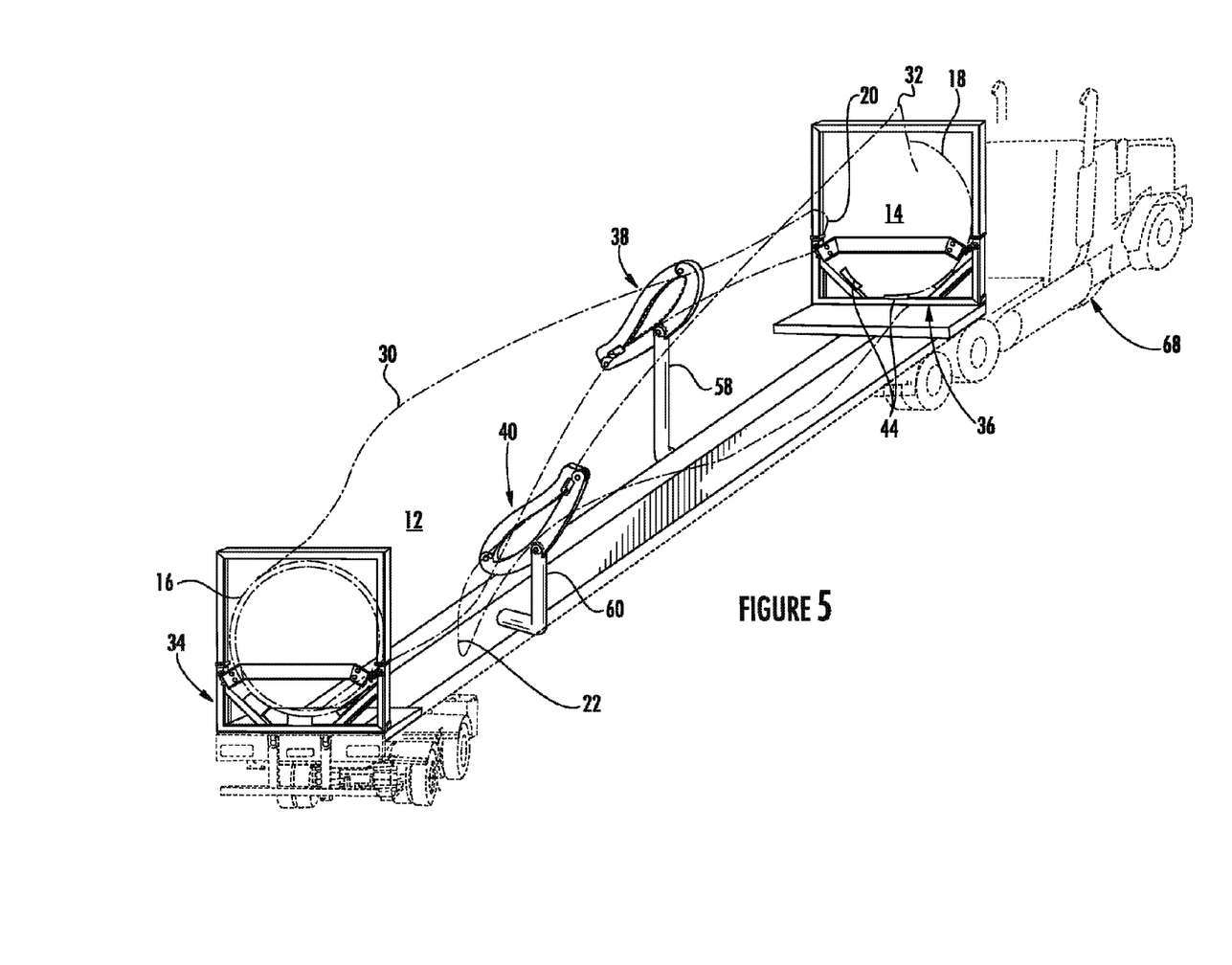
FIG. 5 is a perspective view of an alternate embodiment of the system shown in FIG. 3; and, FIG. 6 is an end view of the system and wind turbine blades shown in FIG. 4.

FIG. 4 shows the system 10 with wind turbine blades 12, 14 loaded on the commercial carrier 68 for transport over public roads and/or storage. As shown in FIG. 4, the first and second tip cradles 38, 40 and the first and second root cradles 34, 36 support the first and second wind turbine blades 12, 14 at an angle approximately 20 to 90 degrees with respect to the horizontal line 65. In particular embodiments, the first and second wind turbine blades 12, 14 may be angled approximately 30 to 80 degrees, 40 to 70 degrees, or 45 degrees with respect to the horizontal line 65. As a result, the system 10 arranges the first and second wind turbine blades 12, 14 to reduce width and height of the system 10 and wind turbine blades 12, 14 during transportation and/or storage.

Figure 6:
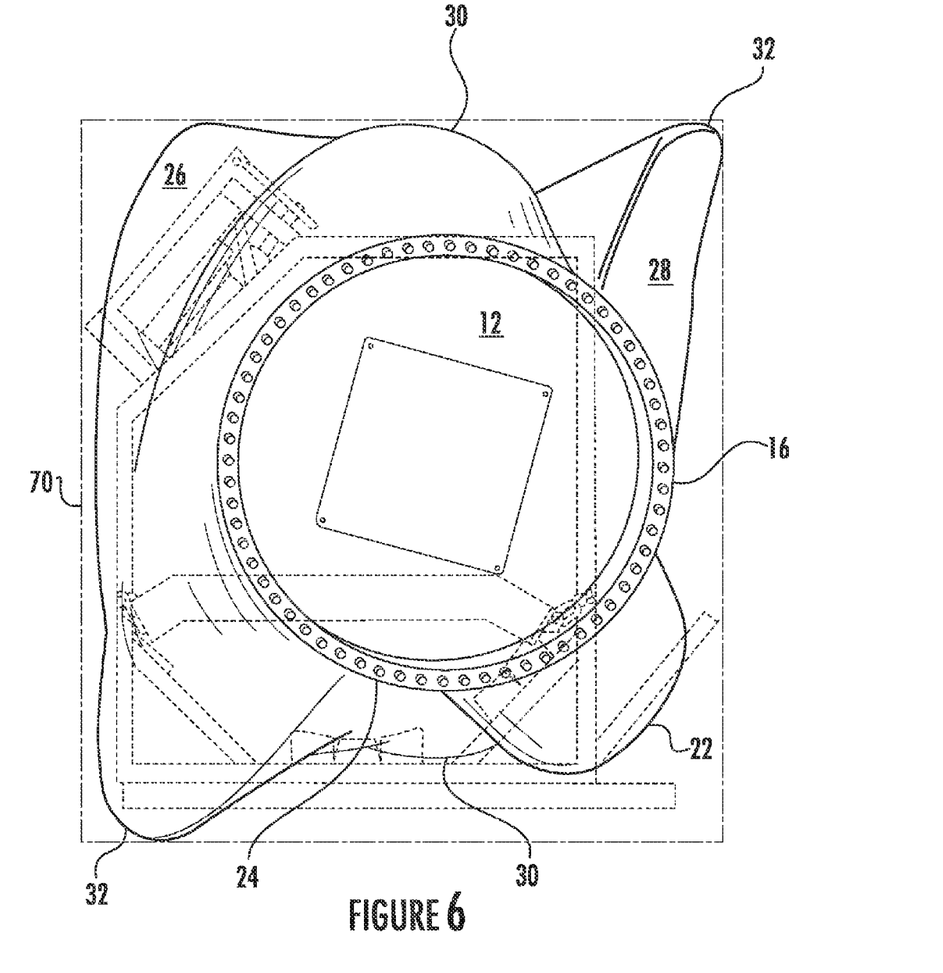

FIG. 6 shows an end view of the system 10 (in phantom) and wind turbine blades 12, 14 shown in FIG. 4. A shipping area 70 for the system 10 and the wind turbine blades 12, 14 is defined as the maximum width and height of the outer perimeter of the system 10 and wind turbine blades 12, 14. The shipping area 70 is shown in FIG. 6 as a dashed box circumscribing the outer perimeter of the system 10 and wind turbine blades 12, 14. With the first 12 and second 14 wind turbine blades arranged approximately diagonally by the system 10, the shipping area has a maximum width of 8½ feet and a maximum height of 13½ feet. It will be appreciated that the shipping area 70 defined by the system 10 and wind turbine blades 12, 14 may fit within or extend beyond the width and height of the commercial carrier 68. As a result, the system 10 arranges the wind turbine blades 12, 14 for transportation and/or storage without exceeding state and local transportation regulations regarding the maximum width and height of items transported on public roads.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for arranging first and second wind turbine blades comprising:
   a. a first root cradle;
   b. a second root cradle opposed to said first root cradle and separated from said first root cradle;
   c. a first support proximate to said second root cradle;
   d. a first tip cradle rotatably connected to said first support; and,
   e. a second tip cradle proximate to said first root cradle.

2. The system of claim 1, wherein said first tip cradle defines a first support plane angled approximately 20 to 90 degrees with respect to a horizon.

3. The system of claim 1, wherein said first support is connected to at least one of said first root cradle or said second root cradle.

4. The system of claim 1, wherein said second tip cradle defines a second support plane angled approximately 20 to 90 degrees with respect to a horizon.

5. The system of claim 1, wherein said first tip cradle includes a first end configured to receive a leading edge of the first wind turbine blade and a second end configured to receive a trailing edge of the first wind turbine blade, and wherein said first end of said first tip cradle is higher than said second end of said first tip cradle.

6. The system of claim 1, wherein said second tip cradle includes a first end configured to receive a leading edge of the second wind turbine blade and a second end configured to receive a trailing edge of the second wind turbine blade, and wherein said first end of said second tip cradle is lower than said second end of said second tip cradle.

7. The system of claim 1, wherein at least part of said first tip cradle is at a higher elevation than any part of said second tip cradle.

8. The system of claim 1, further including a second support proximate said first root cradle.

9. The system of claim 8, wherein said second support is connected to at least one of said first root cradle or said second root cradle.

10. The system of claim 8, wherein said second support is pivotally connected to at least one of said first root cradle or said second root cradle.

11. The system of claim 8, wherein said second tip cradle pivotally connects to said second support.

12. The system of claim 1, wherein said first and second root cradles and the first and second wind turbine blades define a shipping area having a width less than or equal to 8.5 feet.

13. The system of claim 1, wherein said first and second root cradles and the first and second wind turbine blades define a shipping area having a height less than or equal to 13.5 feet.

14. A method for arranging at least two wind turbine blades, comprising:
   a. transferring a first wind turbine blade proximate to a first root cradle;
   b. rotating the first wind turbine blade at least 90 degrees so that the first wind turbine blade is angled approximately 20 to 90 degrees with respect to a horizon and a trailing edge of the first wind turbine blade is lower than a leading edge of the first wind turbine blade;
   c. transferring a second wind turbine blade proximate to a second root cradle; and, d. nesting the second wind turbine blade with the first wind turbine blade.

15. The method of claim 14, further including supporting the leading edge of the first wind turbine blade while transferring the first wind turbine blade to said first root cradle.

16. The method of claim 14, further including rotating the second wind turbine blade so that the second wind turbine blade is angled approximately 20 to 90 degrees with respect to the horizon and a trailing edge of the second wind turbine blade is higher than a leading edge of the second wind turbine blade.

17. A method for arranging at least two wind turbine blades, comprising:
   a. transferring a first wind turbine blade proximate to a first root cradle;
   b. rotating the first wind turbine blade so that the first wind turbine blade is angled approximately 20 to 90 degrees with respect to a horizon and a trailing edge of the first wind turbine blade is lower than a leading edge of the first wind turbine blade;
   c. transferring a second wind turbine blade proximate to a second root cradle; and,
   d. rotating the second wind turbine blade so that the second wind turbine blade is angled approximately 20 to 90 degrees with respect to the horizon and a trailing edge of the second wind turbine blade is higher than a leading edge of the second wind turbine blade.

18. The method of claim 17, further including supporting the leading edge of the first wind turbine blade while transferring the first wind turbine blade to said first root cradle.

19. The method of claim 17, further including rotating the first wind turbine blade at least 90 degrees so that the first wind turbine blade is angled approximately 20 to 90 degrees with respect to a horizon and a trailing edge of the first wind turbine blade is lower than a leading edge of the first wind turbine blade.

20. The method of claim 17, further including nesting the second wind turbine blade with the first wind turbine blade.

\* \* \* \* \*